(12) United States Patent
Landow et al.

(10) Patent No.: US 9,866,895 B2
(45) Date of Patent: Jan. 9, 2018

(54) PERSONALIZED STANDBY AND TRANSITION SCREENS

(71) Applicant: ECHOSTAR TECHNOLOGIES L.L.C., Englewood, CO (US)

(72) Inventors: Kate Landow, Denver, CO (US); Kara Jacobs, Henderson, CO (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 829 days.

(21) Appl. No.: 13/721,953

(22) Filed: Dec. 20, 2012

(65) Prior Publication Data

US 2014/0181876 A1    Jun. 26, 2014

(51) Int. Cl.
| | | |
|---|---|---|
| *H04N 21/458* | (2011.01) | |
| *H04N 21/431* | (2011.01) | |
| *H04N 21/443* | (2011.01) | |
| *H04N 21/45* | (2011.01) | |

(52) U.S. Cl.
CPC ..... *H04N 21/4312* (2013.01); *H04N 21/4432* (2013.01); *H04N 21/4436* (2013.01); *H04N 21/458* (2013.01); *H04N 21/4532* (2013.01)

(58) Field of Classification Search
CPC ............. H04N 21/485; H04N 21/4436; H04N 21/4263; H04N 21/4312; H04N 21/458; H04N 21/4432; H04N 21/4532
USPC ....................... 725/37, 126, 131, 38; 348/553
See application file for complete search history.

(56) References Cited

U.S. PATENT DOCUMENTS

| | | | |
|---|---|---|---|
| 6,670,997 B1* | 12/2003 | Nortrup ......................... 348/558 |
| 7,240,228 B2* | 7/2007 | Bear et al. .................... 713/320 |
| 8,955,003 B2* | 2/2015 | Litvinov .......................... 725/12 |
| 2006/0190357 A1* | 8/2006 | Fuchs et al. .................... 705/27 |
| 2006/0271971 A1* | 11/2006 | Drazin ............... H04N 7/17318 725/86 |
| 2006/0290661 A1* | 12/2006 | Innanen et al. ............... 345/156 |
| 2008/0132287 A1* | 6/2008 | Choi ............................. 455/566 |
| 2008/0167078 A1* | 7/2008 | Eibye ................ H04M 1/72522 455/566 |
| 2009/0158168 A1* | 6/2009 | Heo .................. H04M 1/72569 715/747 |
| 2009/0222875 A1* | 9/2009 | Cheng et al. ................. 725/147 |
| 2011/0007141 A1* | 1/2011 | Hirano ........................... 348/61 |
| 2011/0320057 A1* | 12/2011 | Newell ................ G06F 1/3203 700/296 |
| 2012/0124615 A1* | 5/2012 | Lee ................................. 725/30 |
| 2012/0207443 A1* | 8/2012 | Iwata et al. .................. 386/230 |

(Continued)

OTHER PUBLICATIONS ip.com ; English Translation of Korean Application No. KR 2011-0075236 A, Published on Feb. 6, 2013; "Broadcast receiving apparatus for providing advertisement on mode transition and mode transition method thereof".*

*Primary Examiner* — Nathan Flynn
*Assistant Examiner* — Caroline Somera
(74) *Attorney, Agent, or Firm* — Lorenz & Kopf LLP

(57) ABSTRACT

Methods, system, and set-top box are provided. A method for personalizing a home screen of an electronic device includes entering a standby mode of the electronic device, loading modules based on personalization indicators, retrieving content that is associated with the modules, and generating a video signal while the electronic device is in one of the standby mode and a startup mode. The video signal includes the content. The entertainment system and the set-top box are provided for performing the method.

16 Claims, 5 Drawing Sheets

(56) References Cited

U.S. PATENT DOCUMENTS

| | | | |
|---|---|---|---|
| 2012/0320280 A1* | 12/2012 | Waites et al. | 348/730 |
| 2013/0276031 A1* | 10/2013 | Oh et al. | 725/42 |
| 2013/0278637 A1* | 10/2013 | Innanen et al. | 345/660 |
| 2014/0053189 A1* | 2/2014 | Lee et al. | 725/37 |
| 2014/0130098 A1* | 5/2014 | Kim et al. | 725/48 |
| 2014/0325560 A1* | 10/2014 | Kim et al. | 725/37 |
| 2015/0071153 A1* | 3/2015 | Hong et al. | 370/311 |

* cited by examiner

PERSONALIZED STANDBY AND TRANSITION SCREENS

TECHNICAL FIELD

The technical field generally relates to electronic devices with standby and startup screens, and more particularly relates to electronic devices with personalized home screens during startup and when in standby.

BACKGROUND

Advancements in consumer electronic devices have led to a wide variety of devices that may be powered from an AC power source, such as an electrical outlet in a home. Many of such devices are placed in an off/standby mode when turned off. In the off/standby mode, these devices typically continue to require some power and draw some current.

Further, some devices may continue to perform certain operations even when turned off or in a standby mode. For example, a set-top box for receiving programming signals and other information related to the programming and/or the operation of the set-top box may monitor a receiver or other input even when the set-top box is in an off/standby mode. In particular, programming information in the form of an electronic program guide (EPG) and/or firmware updates may be received by the set-top box when in the off/standby mode so that the EPG and/or firmware of the set-top box may be updated for use when the set-top box is next turned on by the user.

Still further, the set-top box may be configured to continue to decode programming signals when in the off/standby mode so that the set-top box can provide a "quick on" capability to immediately or nearly immediately provide decoded video signals to a television upon being turned on. When in the off/standby mode, the set-top box may typically output no video signal to a connected monitor or may output a static basic message that may not be altered and that indicates the set-top box is in the off/standby mode. Although the off/standby indication is helpful to alert users to the off/standby status of the set-top box, some users may desire more use of the set-top box when the set-top box is in the off/standby mode.

Accordingly, it is desirable to provide an improved method of displaying a standby screen. Furthermore, other desirable features and characteristics of the embodiments disclosed herein will become apparent from the subsequent detailed description and the appended claims, taken in conjunction with the accompanying drawings and this background.

SUMMARY

A method is provided for personalizing a home screen of an electronic device. In one embodiment, the method includes entering a standby mode of the electronic device, loading modules based on personalization indicators, retrieving content that is associated with the modules, and generating a video signal while the electronic device is in one of the standby mode and a startup mode. The video signal includes the content. The entertainment system and the set-top box are provided for performing the method.

A television receiver is provided. In one embodiment, a television receiver includes a communication interface configured to receive video content from a media service provider, an output interface communicatively coupled with a display, and control logic. The control logic is operable to enter a standby mode of the television receiver, load modules based on personalization indicators, retrieve content that is associated with the modules, generate a first video signal while the television receiver is in one of the standby mode and a startup mode, wherein the video signal includes the content, initiate transmission of the first video signal to the display through the output interface, generate a second video signal based on the received video content when the television receiver is in an active mode, and initiate transmission of the second video signal to the display through the output interface.

An entertainment device is provided. In one embodiment, the entertainment device includes control logic and an output interface communicatively coupled to a display. The control logic is operable to enter a standby mode of the set-top box, load modules based on personalization indicators, retrieve content that is associated with the modules, generate a video signal while the set-top box is in the standby mode where the video signal includes the content, and initiate transmission of the video signal to the display through the output interface.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1A:
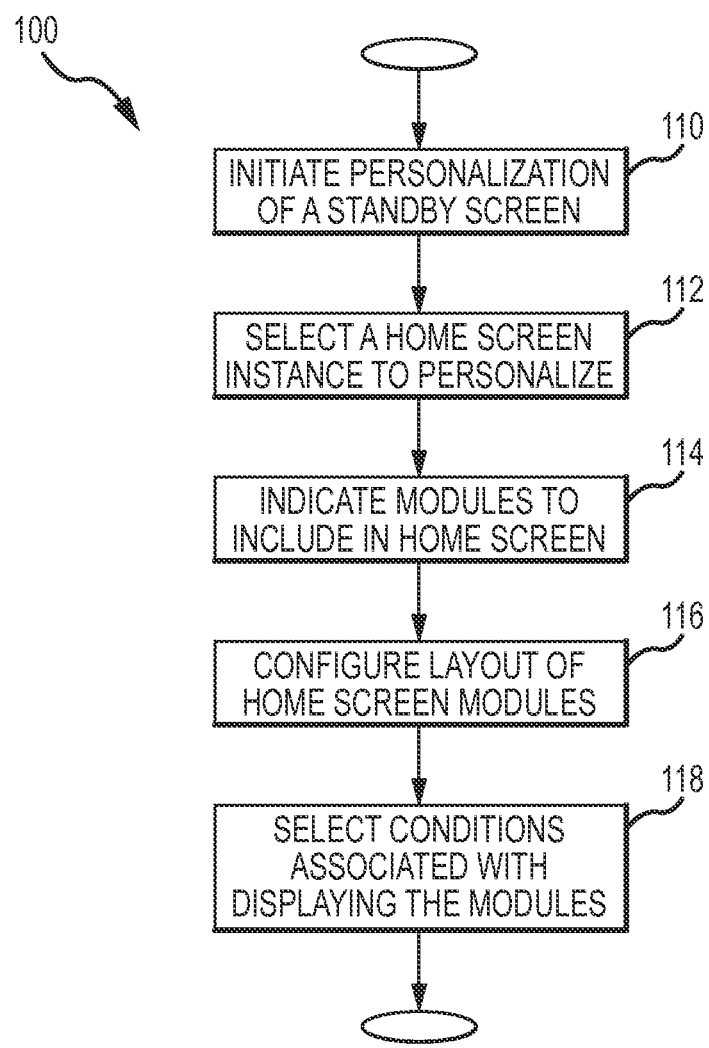
FIG. 1A is a flow diagram of a method in accordance with an embodiment.

FIG. 1A is a flow diagram describing a method 100 for personalizing a home screen. The home screen may also be known as an "off" screen or a standby screen. The home screen is a collection of modules that are to be displayed on a television or monitor when an electronic device is in a standby mode or is powering up/transitioning after exiting the standby mode, as will be described below. The method 100 may be performed for each of a plurality of users of the electronic device to associate particular personalized home screens with particular users.

In some embodiments, the electronic device may be an audio/video entertainment device, such as a set-top box adapted to receive radio and/or television signals by way of satellite, cable, Internet Protocol, or terrestrial ("over-the-air") transmission. Other such audio/video devices may include televisions or video monitors, audio/video receivers, digital video recorders (DVRs), video cassette recorders (VCRs), digital video disc (DVD) players, television receivers, entertainment devices, and gaming systems. In some embodiments, electronic devices aside from audio/video devices, such as computers, personal digital assistants (PDAs), and communication devices may be utilized.

Personalization of the home screen is initiated in operation 110. In some embodiments, a user of the electronic device initiates personalization, such as by selecting an option to personalize the home screen in a setup menu of the electronic device. In some embodiments, a media service provider initiates personalization. For example, a television programming or other media service provider may initiate personalization to add a module that notifies a user when a payment is overdue. In some embodiments, personalization may be initiated as part of an initial configuration of the electronic device.

A home screen instance to personalize is selected in operation 112. In some embodiments, one screen instance may be a standby home screen to be displayed while the electronic device is in the standby mode and another screen instance may be a transition home screen to be displayed while the electronic device is transitioning out of the standby mode. In some embodiments, each user may personalize a separate home screen instance. In some embodiments, users select different home screen instances to display during different times of the day. In some embodiments, only one home screen instance is permitted to restrict the size and complexity of control logic that processes and outputs the home screen.

Modules that are to be included in the home screen are indicated in operation 114. In some embodiments, the modules are indicated in operation 114 when the electronic device is not in the standby mode and all components of the electronic device are available for interacting with the user. The modules are each associated with dynamic content to be displayed on the home screen. For example, a weather module may be added that is associated with temperature content that changes over time. Other modules may display stock information, current time, sunset time, billing status with the media service provider, a list of content stored on a digital video recorder (DVR), a list of content to be recorded by the DVR recorder, upcoming pay-per-view (PPV) content, or other suitable content.

In some embodiments, custom modules may be added with user specified content. For example, a set-top box that receives media content through Internet Protocol (IP) communications may be able to select from a wide range of content to display that is available through a network interface. In some embodiments, the modules available are limited by the media service provider. For example, a set-top box that receives media content through satellite communications may have a limited selection of content that the satellite service provider transmits to the set-top box.

The layout of the modules on the home screen is configured in operation 116. In some embodiments, the layout indicates the positional relationship of the modules with respect to each other or the screen boundaries. In some embodiments, the layout defines various possible locations for the modules to rotate through, such as with a screen saver designed to limit "burn in" on televisions or other monitors.

Conditions associated with displaying the modules are selected in operation 118. For example, a weather module may be displayed in the morning when a user is selecting clothes to wear for the day. Similarly, a module that displays mutual fund prices may be displayed in the evening after the mutual fund price has been updated for the day. In some embodiments, modules may be associated with certain months or times of the year. For example, a user may select conditions that display a module only during college football season when the content of the module includes college football scores. In some embodiments, the conditions are associated with home screen instances in addition to or instead of being associated with the modules.

Figure 1B:
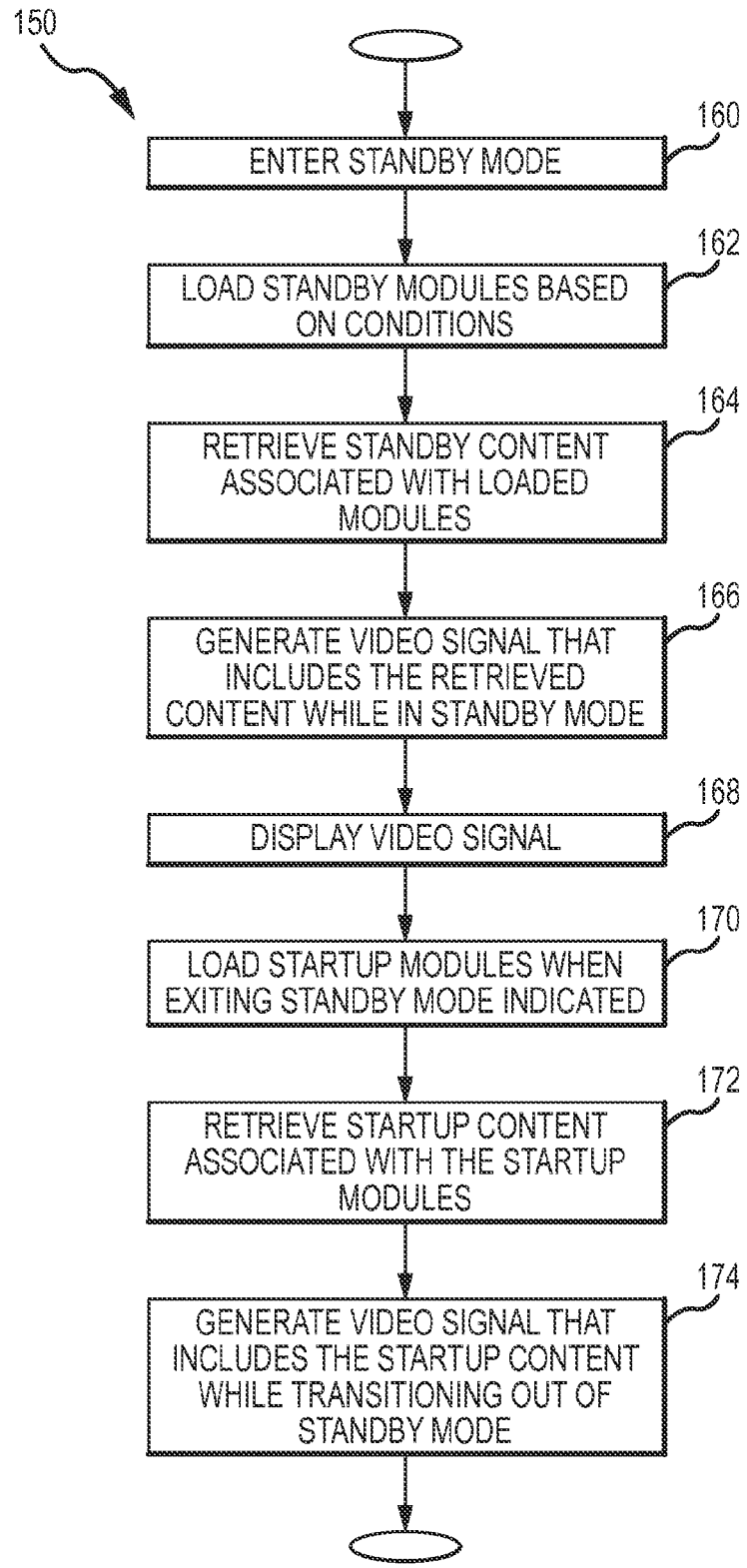
FIG. 1B is a flow diagram of a method in accordance with an embodiment.

FIG. 1B is a flow diagram describing a method 150 for operating an electronic device. The electronic device enters a standby mode in operation 160. One or more operations that are performed by the device when in an "on" mode are suspended and/or performed less frequently when the electronic device is in the standby mode. For example, in the case of a set-top box that monitors for updated electronic program guide (EPG) information when in the standby mode, the monitoring may be suspended or performed less frequently in the sleep/vacation mode so that the set-top box consumes less power in the sleep mode. In some embodiments, various modules of the electronic device are turned off in the standby mode. For example, the tuners of the set-top box may be turned off in the standby mode to conserve power. It should be appreciated that the electronic device may enter the standby mode in response to a user command with a remote control or in response to an event in the electronic device itself. For example, the electronic device may enter the standby mode after an idle timer expires.

Standby modules are loaded in operation 162 based on conditions associated with the module. For example, the modules may be loaded based on the conditions selected in operation 118. In some embodiments, the conditions for loading some modules may be selected by the media service provider associated with the electronic device. For example, the media service provider may instruct the set-top box to load a "bill payment" module when the user is late on a service payment. In some embodiments, a media service provider may "push" certain modules to a set-top box while the set-top box is currently in use or while the set-top box is in the standby mode. For example, the set-top box may monitor a receiver or other input to receive the pushed modules when the set-top box is in the standby mode Content associated with the loaded modules is retrieved in operation 164. In some embodiments, the electronic device is IP capable, and may retrieve the content from a network on a periodic basis. In some embodiments, a satellite connected set-top box retrieves data from the satellite and periodically powers up hard drives to store the content, software updates, and EPG data. In some embodiments, the modules and the content retrieved are limited to text characters to restrict the size and complexity of control logic instructions associated with displaying the home screen.

A video signal that includes the loaded modules and retrieved content is generated in operation 166 when the electronic device is in the standby mode. For example, the video signal may be generated for display on a monitor or television in operation 168. An example of a video signal of operation 166 as displayed by a monitor is described below with reference to FIG. 3.

Startup modules are loaded when exiting the standby mode is indicated in operation 170. A startup or transition home screen displays the startup modules and alerts the user that the electronic device is preparing for use. In some embodiments, the user indicates when to exit the standby mode by pressing a "power" or "on" button on a remote control. In some embodiments, the electronic device exits the standby mode at a specified time of day. It should be appreciated that the startup modules may be the same as or different from the standby modules. In some embodiments, the startup modules are associated with a transition screen instance in operation 112. In some embodiments, the conditions selected in operation 118 determine whether a particular module is a standby module, a startup module, or both a standby and a startup module.

Startup content that is associated with the startup modules is retrieved in operation 172. The startup content is similar to the standby content. In some embodiments where a module is both a standby and a startup module, the startup content associated with the module is retrieved by accessing the standby content in a memory of the electronic device.

A video signal that includes the startup content is generated while the electronic device is transitioning out of the standby mode in operation 174. In some embodiments, the video signal includes other text or graphics to alert the user that the electronic device is exiting the standby mode. For example, the transition home screen may display text that greets the user or states that the electronic device will be ready for use soon. An example of the video signal of operation 74 as displayed by a monitor is described below with reference to FIG. 4.

While FIG. 1A and FIG. 1B illustrate a specific order of execution of operations, other possible orders of execution may be undertaken in other implementations. The other possible orders of execution may include, for example, concurrent execution of one or more operations. In some embodiments, a non-volatile computer-readable storage medium may have encoded thereon instructions for a processor to implement the operations.

Figure 2:
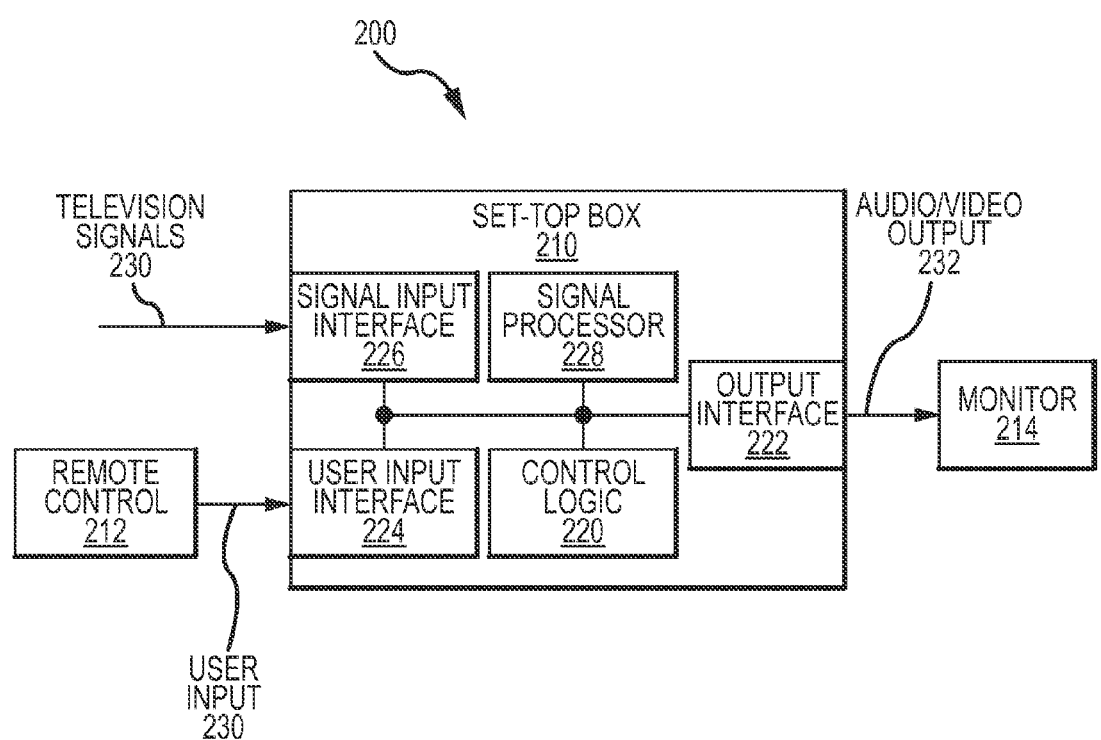
FIG. 2 is a simplified block diagram of an entertainment system in accordance with an embodiment.

FIG. 2 illustrates an entertainment system 200 in accordance with an embodiment. The entertainment system 200 includes a set-top box 210, a remote control 212, and a display or monitor 214.

In some embodiments, the set-top box 210 is the electronic device discussed above in relation to the methods 100 and 150. The set-top box 210 includes control logic 220, an output interface 222, a user input interface 224, a communication or signal input interface 226, and a signal processor 228. The set-top box 210 may be a television set-top box for satellite, cable, Internet Protocol, and/or terrestrial television signal reception. Other modules, such as a DVR, smart card interface, and the like, may also be incorporated into the set-top box 210.

The control logic 220 may include any control circuitry capable of performing the various operations of the set-top box 220. In the example provided, the control logic 220 includes instructions to perform at least some of the operations described in FIG. 1A and FIG. 1B. For example, the control logic 220 may include an application that supports a limited number of modules to limit processing power and storage space in order to support reduced power consumption by the set-top box 220 in the standby mode. In some embodiments, the control logic 220 is further operable to initiate transmission of video signals to the monitor 214 through the output interface 222 and to generate video signals based on received video content when the set-top box 210 is in an active mode.

The control logic 220 may include one or more processors, such as a microprocessor, microcontroller, or DSP, configured to execute instructions directing the processor to perform the operations of the set-top box 210. In some embodiments, the control logic 220 may be hardware-based logic, or may include a combination of hardware, firmware, and/or software elements.

The user input interface 224 is configured to receive user input from a user, such as by way of the remote control device 212 being operated or manipulated by the user. As a result, the user input interface 224 may receive any wired or wireless signals, such as infrared (IR) or radio frequency (RF) signals that carry the user input. In some embodiments, the user input interface 224 receives and processes other types of user input signals emanating from the remote control device 212, such as acoustic or optical signals. In some embodiments, the user input interface 224 also includes a control panel or similar construct that allows the user to provide input more directly to the set-top box 210.

The signal input interface 226 is configured to receive television signals 230. The television signals may include various media content. The television signals 230 may conform to any of several formats, thus dictating in part the specific configuration of the interface 226. In some embodiments, the television signals 230 are IP network packets and the signal input interface 226 is a network interface. In some embodiments, the television signals 230 are transmitted to the set-top box 210 via satellite, and a parabolic antenna coupled with a low-noise block converter feedhorn (LNBF) (not shown) may capture and down-convert the frequencies of the satellite signals before passing these signals to the signal input interface 226. In some embodiments the television signals 230 are cable signals where the signal input interface 226 may receive the signals 230 by way of coaxial cable from a cable head-end or distribution facility. In another example, the television signals 230 are terrestrial signals that the signal input interface 226 may receive by way of an over-the-air antenna (not shown). In each case, the signal input interface 226 transfers the received signals to the signal processor 228 of the set-top box 210.

The signal processor 228 may include any of a number of modules functionally adapted to process the received television signals 230 for ultimate transfer to the output interface 222. In one example, the signal processor 228 includes at least one tuner (not shown) to select one or more of the received television signals 230 associated with a particular programming channel. The at least one tuner may be turned off when the set-top box 210 is in the standby mode. Other processing conducted within the signal processor 228 may include demodulation, demultiplexing, decryption, and decoding of the television signals 230. Once processed, the signal processor 228 transfers the signals 230 to the output interface 222.

The output interface 222 outputs an audio/video output 232 resulting from the processing of the television signals 230 to an output device, such as the monitor 214. The output interface 222 may provide the audio/video output 232 in a number of formats, such as modulated RF output, composite video output, component video output, and output conforming to the High-Definition Multimedia Interface (HDMI).

The user may control various aspects of the signal processor 228, such as which of the television signals 230 to view, the audio volume of the selected television signal 230, and so on, by way of the remote control device 212 and the user input interface 224 in conjunction with visual information provided to the user by way of the output interface 222 and the monitor 214. Other functions, such as general set-top box parameter modification, timer recording, electronic program guide (EPG) presentation, and the like, may also be controlled in such a manner. To that end, the control logic 220 generates an image associated with the graphical user interface. The user then manipulates the remote control device 212 to enter user input to the control logic 220 while the control logic 220 provides visual feedback regarding that input to the user by way of the generated image. For example, the user may initiate personalization of the standby screen and may select modules to add or remove in operation 114 by using the remote control device 212 and a graphical user interface. The user input may include any user-initiated operation, such as volume changes, channel changes, and the like.

Figure 3:
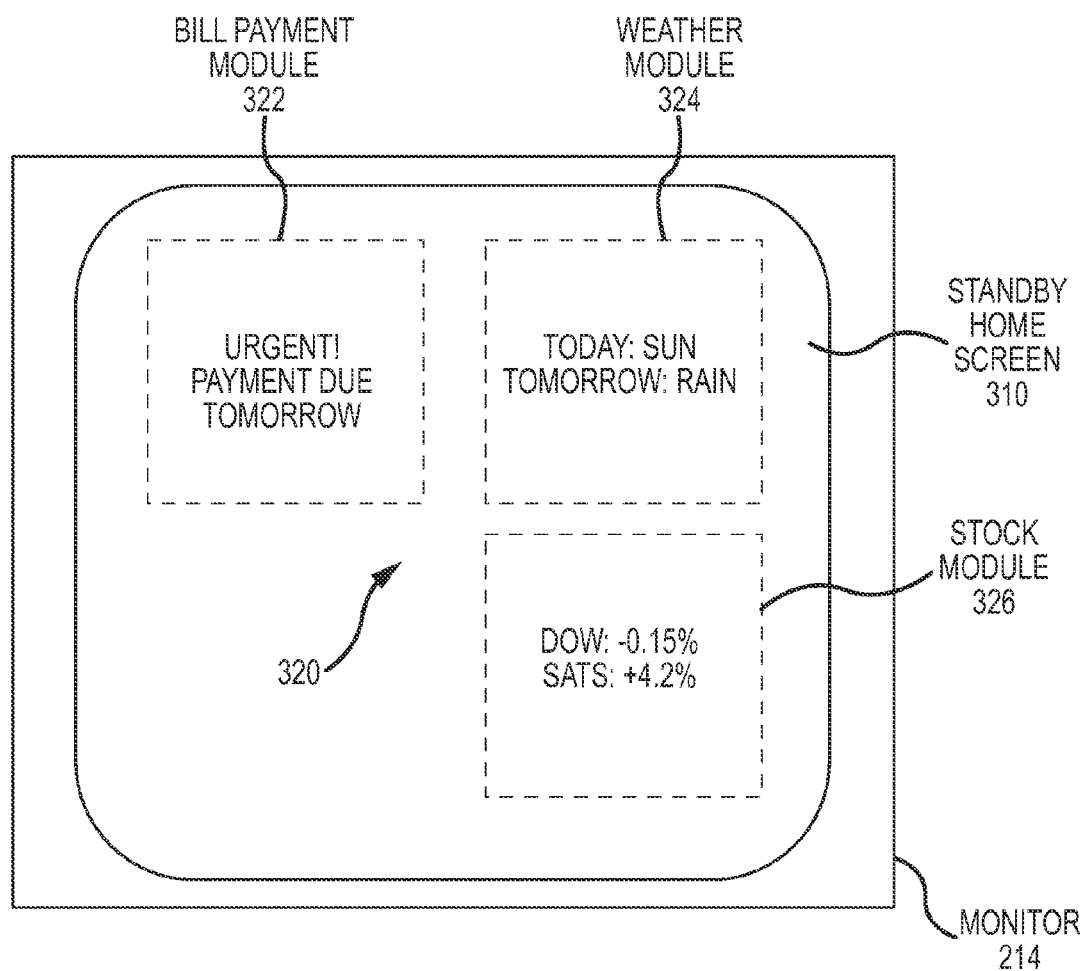
FIG. 3 is a simplified block diagram of a personalized home screen in accordance with an embodiment.

FIG. 3 illustrates an example of a standby home screen 310 displayed on the monitor 214 when the set-top box 214 is in the standby mode. The home screen 310 is generated by the output interface 222 of the set-top box and transmitted to the monitor 214 by the audio/video output 232. The home screen 310 includes at least one module 320. The example illustrated includes a bill payment module 322, a weather module 324, and a stock module 326. In some embodiments, the weather module 324 and the stock module 326 were added by the user of the set-top box 210 and the bill payment module 322 was added by the media service provider. It should be appreciated that many configurations and combinations of the home screen 310 may be incorporated without departing from the scope of the present disclosure.

Figure 4:
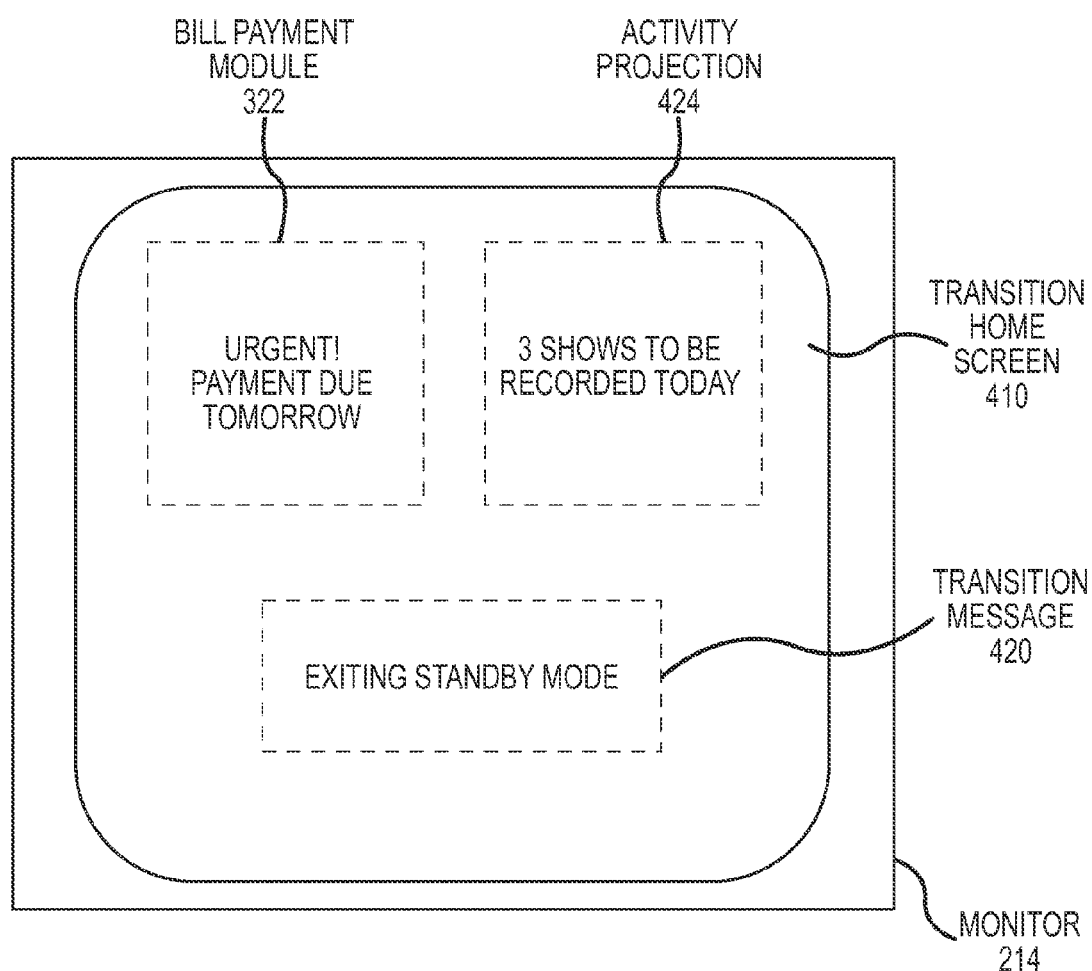
FIG. 4 is a simplified block diagram of a personalized home screen in accordance with an embodiment.

FIG. 4 illustrates an example of a transition home screen 410 displayed on the monitor 214 when the set-top box 214 is transitioning out of the standby mode. The home screen 410 is generated by the set-top box and transmitted to the monitor 214 by the audio/video output 232. The home screen 410 is illustrated with a transition message 420, the bill payment module 322, and an activity projection module 426. It should be appreciated that many configurations and combinations of the home screen 410 may be incorporated without departing from the scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for personalizing a home screen of a television receiver, the method comprising:
   entering a standby mode of the television receiver in which the television receiver does not receive video media content from a media service provider who provides the video media content for viewing in an active mode of the television receiver;
   loading modules based on personalization indicators based on conditions defined by at least one of a user of the television receiver and the media service provider associated with the television receiver;
   retrieving dynamic content that is associated with the modules and is different from the video media content; and
   generating a video signal while the television receiver is in the standby mode, wherein the video signal includes the dynamic content.

2. The method of claim 1 wherein generating a video signal includes generating the video signal while the television receiver is in the standby mode.

3. The method of claim 1 further including indicating the modules to be included in the home screen when the television receiver is in the standby mode, wherein the television receiver is not in the standby mode during indicating the modules.

4. The method of claim 3 further including configuring a layout of the modules on the home screen.

5. The method of claim 1 wherein retrieving the dynamic content includes retrieving the dynamic content with at least one of a network card and satellite communications.

6. The method of claim 1 further including receiving the personalization indicators from the media service provider.

7. The method of claim 1 wherein entering the standby mode includes turning off at least one tuner.

8. A television receiver comprising:
   a communication interface configured to receive video media content from a media service provider;
   a tuner configured to select at least one television signal associated with a programming channel;
   an output interface communicatively coupled with a display; and
   control logic operable to:
      enter a standby mode of the television receiver in which the communication interface does not receive the video media content from the media service provider;
      load modules based on personalization indicators, wherein loading the modules is based on conditions defined by at least one of a user of the television receiver and the media service provider associated with the television receiver;
      retrieve dynamic content that is associated with the modules and that is different from the video media content;
      generate a first video signal while the television receiver is in the standby mode, wherein the video signal includes the dynamic content;
      initiate transmission of the first video signal to the display through the output interface;
      generate a second video signal based on the received video media content when the television receiver is in an active mode; and
      initiate transmission of the second video signal to the display through the output interface.

9. The television receiver of claim 8 wherein the control logic is operable to generate the first video signal while the television receiver is in the standby mode.

10. The television receiver of claim 8 wherein the control logic further includes instructions for indicating the modules to be included in the generated video signal when the television receiver is in the standby mode, wherein the television receiver is not in the standby mode during indicating the modules.

11. The television receiver of claim 8 wherein the communication interface comprises a satellite interface.

12. The television receiver of claim 8 wherein the communication interface comprises at least one tuner, and wherein entering the standby mode includes turning off the at least one tuner.

13. A set-top box comprising:
   a signal input interface configured to receive video media content from a media service provider;
   an output interface communicatively coupled to a display: and
   control logic operable to:
      enter a standby mode of the set-top box in which the signal input interface does not receive the video media content from the media service provider;
      load modules based on personalization indicators and on on conditions defined by at least one of a user of the entertainment device and the media service provider associated with the entertainment device;

retrieve dynamic content that is associated with the modules and is different from the video media content;

generate a video signal while the set-top box is in the standby mode, the video signal including the dynamic content; and initiate transmission of the video signal to the display through the output interface.

14. The set-top box of claim 13 wherein the control logic is further operable to generate the video signal while the entertainment device is in the standby mode.

15. The set-top box of claim 13 wherein the control logic is operable to indicate the modules to be included in the generated video signal when the entertainment device is in the standby mode, wherein the entertainment device is not in the standby mode during indicating the modules.

16. The set-top box of claim 13 wherein the signal input interface includes at least one of a satellite interface and a network interface, and wherein the control logic is further operable to retrieve the dynamic content using the signal input interface.

* * * * *